(12) United States Patent
Yoneya et al.

(10) Patent No.: US 8,926,106 B2
(45) Date of Patent: Jan. 6, 2015

(54) STROBE DEVICE

(71) Applicant: Stanley Electric Co., Ltd., Meguro-ku, Tokyo (JP)

(72) Inventors: Takayuki Yoneya, Tokyo (JP); Atsumi Miyazawa, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 160 days.

(21) Appl. No.: 13/770,822

(22) Filed: Feb. 19, 2013

(65) Prior Publication Data

US 2013/0215592 A1 Aug. 22, 2013

(30) Foreign Application Priority Data

Feb. 20, 2012 (JP) ................. 2012-034025

(51) Int. Cl.
*G03B 15/02* (2006.01)
*G03B 15/03* (2006.01)
(52) U.S. Cl.
CPC ........ *G03B 15/03* (2013.01); *G03B 2215/0582* (2013.01)
USPC ....................... 362/16; 362/217.05
(58) Field of Classification Search
CPC .................................................. F21Y 2101/02
USPC ....................... 362/16, 555, 516, 217.05, 341
See application file for complete search history.

(56) References Cited

U.S. PATENT DOCUMENTS 6,445,885 B2 * 9/2002 Nakanishi et al. ............ 396/176

FOREIGN PATENT DOCUMENTS

JP 2010-097074 A 4/2010

* cited by examiner

*Primary Examiner* — Vip Patel
(74) *Attorney, Agent, or Firm* — Holtz, Holtz, Goodman & Chick PC

(57) ABSTRACT

A strobe device 1 includes an electrically-conductive reflector 3 into which a xenon tube 2 having xenon gas enclosed therein and having a light-transmitting property is housed. The xenon tube 2 has an anode 21 and a cathode 22 at both ends, and a sintered body 23 electrically connected to the cathode 22 at the cathode-22 side inside the xenon tube 2. A cathode-22-side end 34a of a bottom surface 34 of the reflector 3 is positioned closer to the anode-22 side than the sintered body 23. The bottom surface 34 is provided with an electrically-conductive projecting portion 35 projecting from the cathode-22-side end 34a so as to be closer to the cathode-22 side than the anode-side end 23a of the sintered body 23.

2 Claims, 3 Drawing Sheets

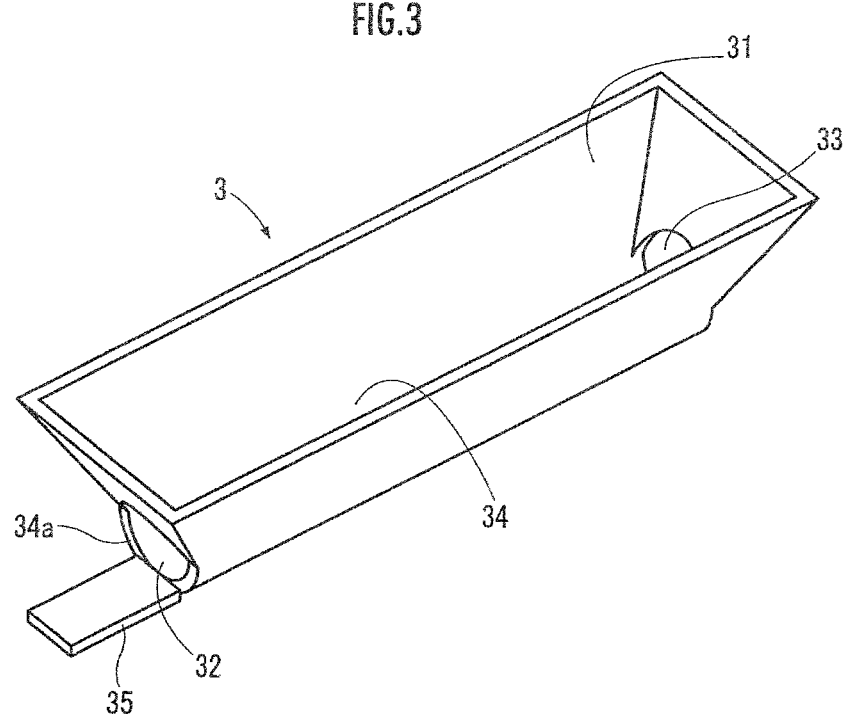
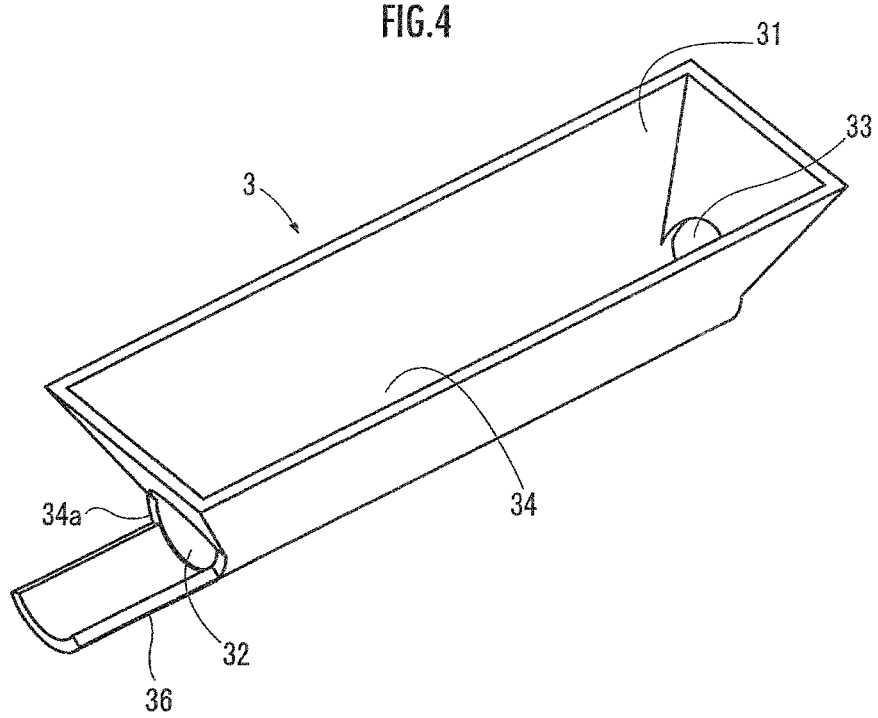

STROBE DEVICE

BACKGROUND OF THE INVENTION

1. Field of the Invention

The present invention relates to a strobe device including a discharge tube having rare gas enclosed therein.

2. Description of the Related Art

There has been conventionally known a strobe device in which a xenon tube having xenon gas enclosed therein is housed in a reflector having an opening on a front side (Patent Document 1). In this strobe device, both ends of the xenon tube stick out from side surfaces of the reflector.

Generally, in such a xenon tube, an anode and a cathode are formed at both ends of a glass tube forming an outer frame thereof. Further, the xenon tube is provided with a sintered body electrically connected to the cathode and having electric conductivity at a cathode side inside the xenon tube. This sintered body functions as an electron source having a property to emit electrons which excite xenon gas when a voltage is applied.

Further, generally, such a reflector has a surface at least partially having electric conductivity (hereinafter such a surface is referred to as an "electrically-conductive surface"), and a trigger voltage to generate flash from the xenon tube is applied to the electrically-conductive surface (e.g., a bottom surface of the reflector) of the reflector. Since the trigger voltage is a high voltage, when the trigger voltage is applied to the reflector, the trigger voltage is discharged to the sintered body through the glass tube.

This causes electrons to be emitted from the sintered body, and the electrons move toward the anode of the xenon tube. The electrons thus moving at this time collides with electrons in atoms of xenon gas, thereby causing the xenon gas to emit light. The light thus emitted from the xenon gas is condensed on a front side by reflection from a front surface of the reflector, so that light with high luminance is projected toward a front surface of the strobe device.

Patent Document 1: Japanese Patent Application Laid-Open No. 2010-97074

SUMMARY OF THE INVENTION

In recent years, an apparatus (e.g., a mobile phone equipped with a camera function, and the like) in which a strobe device is to be provided is downsized, and downsizing of the strobe device in itself is also demanded. For example, in a case where the strobe device is provided in a mobile phone equipped with a camera function, an auxiliary-light emitting section for an autofocus function of a camera may be placed in vicinity to a light emitting section of the strobe device due to constraint of design.

In such a case, the auxiliary-light emitting section may be placed in a vacant space which is formed by shortening a length of a reflector of the strobe device. At this time, if a length of a xenon tube is also shortened as well as the length of the reflector, luminance of strobe light is decreased, thereby impairing functionality as the strobe device. In view of this, it is necessary to secure the length of the xenon tube as long as possible.

However, if the length of the reflector is shortened while the length of the xenon tube is maintained, "an end, at a cathode side of the xenon tube, among both ends of an electrically-conductive surface of the reflector" may have to be configured to be positioned closer to an anode side of the xenon tube than "an anode-side end of a sintered body placed in the xenon tube," due to constraint of a wiring pattern or the like, for example.

In this case, there is a possibility that a trigger voltage applied to the electrically-conductive surface of the reflector may not be discharged sufficiently to the sintered body of the xenon tube. This may cause such a problem that electrons are not emitted sufficiently from the sintered body and xenon gas cannot be excited sufficiently. If xenon gas is not excited sufficiently, it is difficult to emit strobe light.

The present invention is aimed at providing a strobe device which is able to emit strobe light stably even if a length of a reflector is shortened while a length of a tube is maintained so that "a cathode-side end of an electrically-conductive surface" is positioned closer to an anode side than "an anode-side end of an electron source."

The present invention is a strobe device including a tube having rare gas enclosed therein and having a light-transmitting property, and a reflector formed in a box shape into which the tube is housed, wherein: the tube includes an anode provided on one end of the tube; a cathode provided on another end of the tube, the another end being provided opposite to the one end, and an electron source having electric conductivity, placed at the another-end side inside the tube, electrically connected to the cathode, and supplying electrons for exciting the rare gas when a voltage is applied thereto; the reflector has a surface at least partially having electric conductivity, has a front-surface opening portion provided on a front surface of the reflector and configured to be opened so that at least part of a side surface of the tube is exposed, and has a side-surface opening portion provided on a side surface of the reflector at the cathode side and configured to be opened so that the another end of the tube projects outwardly; the reflector is configured such that the cathode-side end of the surface having electric conductivity is formed to be positioned closer to the anode side than the electron source; and the reflector includes an electrically-conductive projecting portion configured to project from the cathode-side end of the surface having electric conductivity so as to be closer to the cathode side than the anode-side end of the electron source.

According to the present invention, the reflector is formed so that "the cathode-side end of the surface having electric conductivity (hereinafter referred to as an "electrically-conductive surface") is positioned closer to the anode side than "the anode-side end of the electron source." Further, the projecting portion is provided to project from "the cathode-side end of the electrically-conductive surface of the reflector" so as to be closer to the cathode side than "the anode-side end of the electron source." At this time, since the projecting portion has electric conductivity, the projecting portion is electrically connected to the electrically-conductive surface of the reflector.

Accordingly, when a trigger voltage for causing the strobe device to emit strobe light is applied to the electrically-conductive surface of the reflector, the trigger voltage is also applied to the projecting portion projecting from the electrically-conductive surface of the reflector. Since the trigger voltage is generally a high voltage, the trigger voltage is discharged to the tube from the projecting portion, and electrons are emitted from the electron source. The electrons thus emitted accordingly excite rare gas, thereby causing the rare gas to emit light.

Thus, since the projecting portion is provided on the electrically-conductive surface of the reflector, when a trigger voltage is applied, it is possible to stably supply the voltage to the electron source. Hereby, even in a case where a length of the reflector is shortened while a length of the tube is maintained so that "the cathode-side end of the electrically-conductive surface" is positioned closer to the anode side than "the anode-side end of the electron source," it is possible to stably emit strobe light.

In the present invention, it is preferable that the projecting portion be formed integrally with the surface having electric conductivity. This makes it possible to reduce manufacture costs in comparison with those in which the reflector and the projecting portion are formed as separate members.

BRIEF DESCRIPTION OF THE DRAWINGS

FIG. 3 is a perspective view of the reflector of the strobe device of FIG. 1.

FIG. 4 is a perspective view of a reflector of a strobe device of another embodiment.

DESCRIPTION OF THE PREFERRED EMBODIMENTS

The following describes a configuration of a strobe device of an embodiment of the present invention. A strobe device 1 of the present embodiment is provided, for example, in a mobile phone equipped with a camera function.

Figure 1:
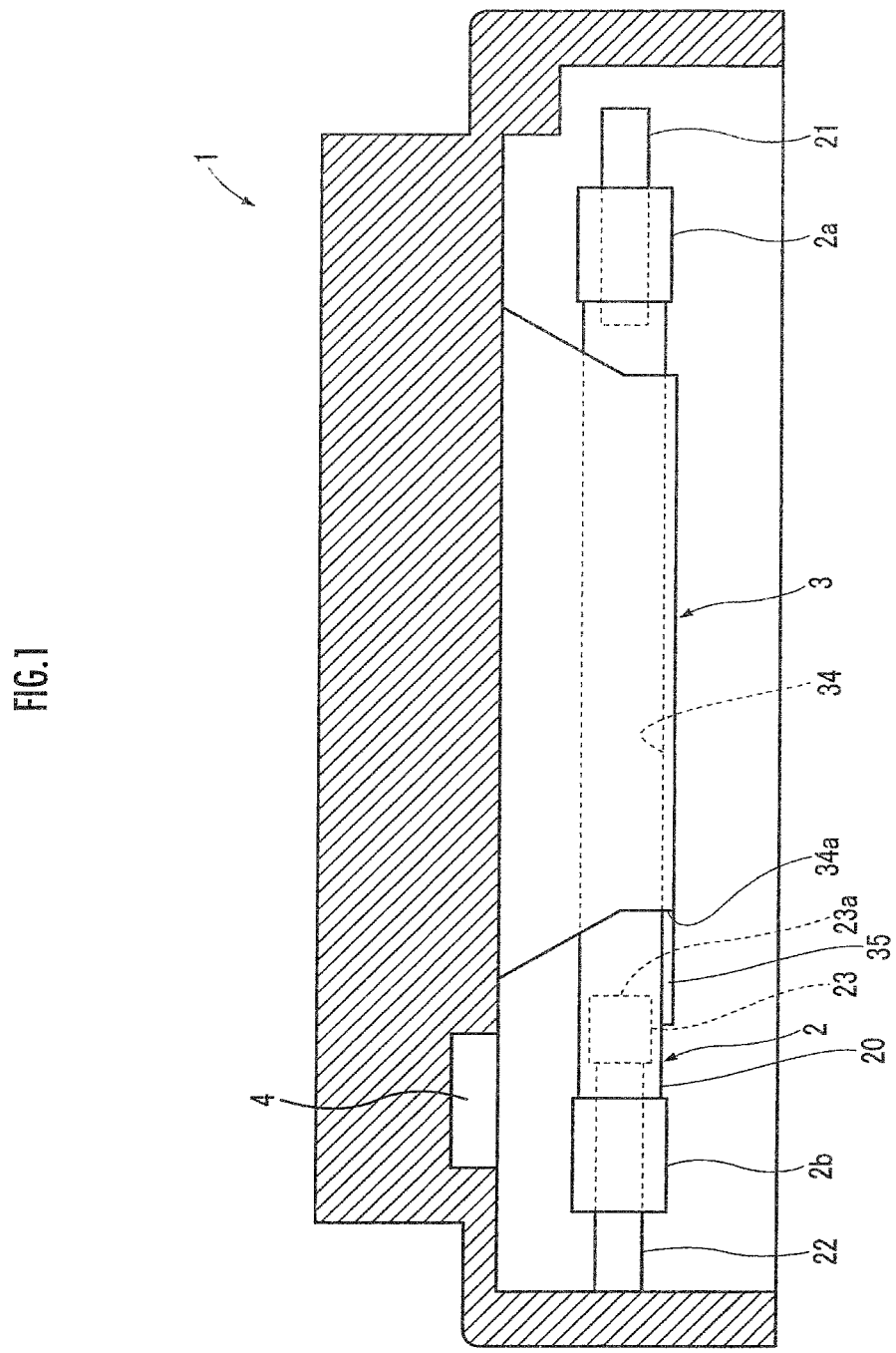
FIG. 1 is a view illustrating a configuration of a strobe device of an embodiment of the present invention.
Figure 2:
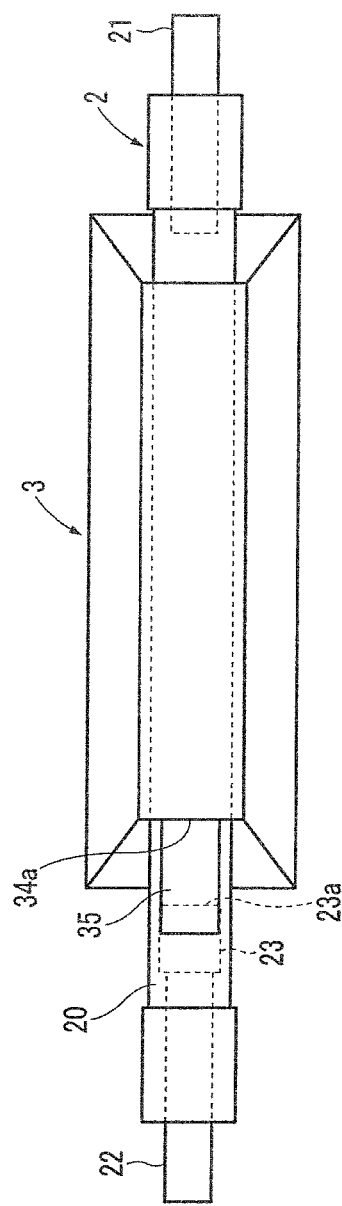
FIG. 2 is a back view of a reflector and a xenon tube at a cathode side of the strobe device of FIG. 1.

As illustrated in FIGS. 1 and 2, the strobe device 1 includes a xenon tube 2, a reflector 3, and an auxiliary-light emitting section 4.

The xenon tube 2 includes a cylindrical glass tube 20 including large-diameter portions 2a and 2b at both ends. Xenon gas is enclosed in the glass tube 20. A transparent electrode (not illustrated) constituting a trigger electrode for applying a trigger voltage for light emission is applied on an outer surface of this glass tube 20. Further, the xenon tube 2 includes an anode 21 and a cathode 22 at both ends thereof.

Further, the xenon tube 2 includes a sintered body 23 having electric conductivity and electrically connected to the cathode 22, at the cathode-22 side inside the xenon tube 2. The sintered body 23 emits electrons which excite xenon gas when a high voltage is applied thereto. The electrons thus emitted move toward the anode 21. Here, the sintered body 23 corresponds to "an electron source" in the present invention.

The reflector 3 is formed in a box shape which is opened at a front side of the strobe device 1 by use of aluminum as a material. Hereinafter, this opening is referred to as a front-surface opening portion 31. Further, a side that is opened is referred to as a front side, and an opposite side to the front side is referred to as a back side. The reflector 3 projects light emitted by the xenon tube 2 from the front-surface opening portion 31 toward a projecting direction (a front-surface direction of the strobe device 1). A curvature of a parabolic surface is set to the reflector 3 so that the front-side surface (hereinafter just referred to as a "front surface") can efficiently project light emitted from the xenon tube 2 toward the projecting direction. Note that the reflector may have any shape as long as it can reflect light to a desired projecting direction. Further, the reflector 3 is formed by punching out from one aluminum sheet and pressing the same.

In a state where the xenon tube 2 is housed, a bottom surface 34 of the reflector 3 makes contact with the transparent electrode of the glass tube 20 of the xenon tube 2. Note that, in the present embodiment, an entire surface of the reflector 3 is made from aluminum and therefore has electronic conductivity. Even in such a case, a "surface having electronic conductivity" in the present invention denotes, in the essential meaning, a surface (a part which comes in contact with the transparent electrode, for example, in the present embodiment) for applying a voltage to the tube so as to apply a trigger voltage for exciting rare gas (e.g., xenon gas) thereto. Accordingly, in the present embodiment, the bottom surface 34 of the reflector 3 which makes contact with the xenon tube 2 (the transparent electrode, more specifically) corresponds to the "surface having electronic conductivity" in the present invention.

Note that a conducting wire may be coiled around the xenon tube 2 (the glass tube 20, more specifically) instead of the transparent electrode as long as a voltage can be applied to a substantially entire surface thereof. Further, nothing may be provided on a periphery of the xenon tube 2 (the glass tube 20, more specifically), and the surface having electric conductivity (the bottom surface 34) in the reflector 3 may be provided so as to directly make contact with the xenon tube 2 (the glass tube 20, more specifically).

That is, the reflector 3 (the bottom surface 34 as the surface having electric conductivity, more specifically) should make contact with an electrode (the applied transparent electrode, the coiled conducting wire, or the like, for example) provided on a side surface of the xenon tube 2 or substantially entirely on the side surface of the xenon tube 2. Hereby, when a trigger voltage is applied to the reflector 3, the voltage is discharged to the sintered body 23 as an electron source and the xenon gas enclosed in the xenon tube 2 is excited generally, thereby making it possible to stably emit strobe light.

With the use of the transparent electrode having a light-transmitting property like the present embodiment, generally, it is possible to prevent part of light emitted from the xenon gas from being blocked off, in comparison with a case where a conducting wire which does not pass light therethrough is coiled. Further, in a case where the transparent electrode is used or the conducting wire is coiled like the present embodiment, it is possible to further ensure electric connection to the surface having electric conductivity (the bottom surface 34) in the reflector 3, in comparison with those in which the transparent electrode and the conducting wire are not provided.

The auxiliary-light emitting section 4 includes a white light-emitting diode as a light source. A camera (not illustrated) provided with the strobe device 1 of the present embodiment turns on the light-emitting diode of the auxiliary-light emitting section 4 at the time of taking a picture according to a control by a control section (not illustrated) provided with an electronic circuit and the like. Then, the control section estimates a distance between the camera and a subject based on a time taken for light emitted from the light-emitting diode to be reflected from the subject or the like and return (a so-called automatic focusing function). Thus, the auxiliary-light emitting section 4 is used for so-called automatic focusing.

Since the strobe device 1 of the present embodiment is to be provided in a mobile phone, it has been necessary for the strobe device 1 to be downsized in a state where the auxiliary-light emitting section 4 is placed in the strobe device 1 on account of design and the like. In view of this, in order to respond to the request of downsizing, the inventors of the present invention conceive of such an idea that a length of the reflector 3 in a longitudinal direction (a crosswise direction of FIG. 1) (hereinafter just referred to as a "length of the reflector 3") is shortened to form a space and the auxiliary-light emitting section 4 is placed in the space (see FIG. 1). At this time, if a length of the xenon tube 2 in a longitudinal direction (hereinafter just referred to as a "length of the xenon tube 2")

is also shortened when the length of the reflector 3 is shortened, luminance at the time when the xenon tube 2 emits light is decreased, thereby impairing merchantability as the strobe device 1. In view of this, it is necessary to secure the length of the xenon tube 2 as long as possible.

However, as a result of shortening the length of the reflector 3 while the length of the xenon tube 2 is maintained, the reflector 3 is formed such that "among both ends of the bottom surface 34 of the reflector 3, an end (hereinafter, this end is referred to as a "bottom-surface cathode-side end") 34*a* at a cathode-22 side of the xenon tube 2" is positioned closer to an anode-21 side of the xenon tube 2 than "an anode-21-side end (hereinafter, this end is referred to as "a sintered-body anode-side end") 23*a* of the sintered body 23 placed inside the xenon tube 2." Here, that the reflector 3 is formed as such corresponds to "the reflector is configured such that a cathode-side end of the surface having electric conductivity is formed to be positioned closer to an anode side than the electron source" in the present invention.

When a voltage (e.g., 300[V]) is applied between the anode 21 and the cathode 22 while a high voltage (e.g., 6 [kV]. Hereinafter, this voltage is referred to as a "trigger voltage") is applied to a substantially entire side surface of the xenon tube 2 and to the sintered body 23, the xenon tube 2 emits light with very high luminance (so-called strobe light emission).

A lead wire (not illustrated) is electrically connected to the reflector 3, and the trigger voltage is applied to the lead wire. This causes the trigger voltage to be applied to the xenon tube 2 through the reflector 3. As described above, the transparent electrode (not illustrated) is applied on a substantially entire side surface of the xenon tube 2 (the glass tube 20, more specifically). Accordingly, when the trigger voltage is applied to the reflector 3, the trigger voltage is applied to the substantially entire side surface of the xenon tube 2 through the transparent electrode.

Before the length of the reflector is shortened, the cathode-side end of the reflector is placed closer to a cathode-22 side than the sintered-body anode-side end 23*a*. In this configuration, since the trigger voltage applied to the reflector is a high voltage, the voltage is discharged from the bottom surface of the reflector to the sintered body 23 through the glass tube 20 of the xenon tube 2.

However, in the present embodiment, since the auxiliary-light emitting section 4 is placed as described above, the bottom-surface cathode-side end 34*a* is positioned closer to the anode-21 side of the xenon tube 2 than the sintered-body anode-side end 23*a*. The transparent electrode is applied on the substantially entire side surface of the xenon tube 2 (the glass tube 20, more specifically), but the transparent electrode is applied so as to prevent the cathode 22 grounded to a reference potential point from being electrically conducted to the transparent electrode. On this account, the transparent electrode is applied with a predetermined distance from a cathode-22-side end of the xenon tube 2. Further, a liquid electrode is applied as the transparent electrode. Because of this, the transparent electrode applied on the glass tube 20 becomes uneven in shape, position, and the like when the transparent electrode solidifies.

Accordingly, even if the strobe device 1 is configured such that the transparent electrode is applied to an area closer to the cathode-22 side than the sintered-body anode-side end 23*a* so that the trigger voltage is applied to the sintered body 23 by the transparent electrode, there will be caused large individual differences in terms of variation of the transparent electrode. Thus, it is difficult to configure every individual strobe device 1 so that the trigger voltage is stably applied to the sintered body 23.

In view of this, in the strobe device 1 of the present embodiment, a plate-like projecting portion 35 having electric conductivity and projecting from the "bottom-surface cathode-side end 34*a*" so as to be "closer to the cathode-22 side than the sintered-body anode-side end 23*a*" is provided in the reflector 3. At this time, the projecting portion 35 makes contact with a "surface closer to the cathode-22 side than the sintered-body anode-side end 23*a*" in the xenon tube 2. The projecting portion 35 is formed of an aluminum sheet integrally with the reflector 3. Accordingly, the projecting portion 35 is electrically connected to the reflector 3.

With such a projecting portion 35, the trigger voltage applied to the reflector 3 is transmitted to the projecting portion 35, thereby being discharged to the sintered body 23 through the glass tube 20. This discharge causes electrons to be emitted from the sintered body 23, and the electrons move toward the anode 21. The electrons thus moving at this time collides with electrons in atoms of xenon gas, thereby causing the xenon gas to emit light. By reflecting the light thus emitted from the xenon gas from a front-side surface of the reflector 3, the strobe device 1 projects light with high luminance toward the front side of the strobe device 1.

As such, according to the strobe device 1 of the present embodiment, since the projecting portion 35 is configured as described above, a variation in a relative positional relationship between the projecting portion 35 and the sintered body 23 is reduced. Further, in the present embodiment, the reflector 3 is configured so as to apply the trigger voltage to the xenon tube 2 from the bottom surface 34, and the bottom-surface cathode-side end 34*a* is formed so as to be positioned closer to the anode-21 side than the sintered-body anode-side end 23*a*. Even in this case, the reflector 3 is provided with a plate-like projecting portion 35 having electric conductivity and projecting from the "bottom-surface cathode-side end 34*a*" so as to be closer to "the cathode-22 side than the sintered-body anode-side end 23*a*."

Therefore, it is possible to configure every individual strobe device 1 so that the trigger voltage is stably applied to the sintered body 23 via the projecting portion 35. Accordingly, even in a case where a length of a reflector is shortened while a length of a tube is maintained so that "a cathode-side end of an electrically-conductive surface" is positioned closer to an anode side than "an anode-side end of an electron source," the strobe device 1 of the present embodiment is able to prevent a decrease in luminance and also to prevent such a case where xenon gas may not emit light, thereby making it possible to stably emit strobe light.

Further, in the present embodiment, the projecting portion 35 is formed integrally with the reflector 3. In view of this, the reflector 3 and the projecting portion 35 are formed by punching out from one aluminum sheet and pressing the same. Accordingly, in comparison with a case where the projecting portion 35 and the reflector 3 are manufactured separately and then the projecting portion 35 is attached to the reflector 3, it is possible to simplify a production process and to reduce a manufacture cost.

Note that, in the present embodiment, the projecting portion is formed in a plate-like shape, but is not limited to this. The projecting portion should "project from a cathode-side end (the bottom-surface cathode-side end 34*a*) of a surface having electric conductivity so as to be closer to a cathode-22 side than an anode-side end (the sintered-body anode-side end 23*a*) of an electron source." This allows the projecting portion to make contact with a side surface of the xenon tube 2 (more specifically, in the side surface of the xenon tube 2, a side surface closer to the cathode-22 side than the anode-21-side end 23*a* of the sintered body 23 as the electron source), thereby resulting in that when the trigger voltage is applied to the reflector 3, it is possible to stably discharge the voltage to the sintered body 23 from the projecting portion.

As illustrated in a reflector 3 of a strobe device of another embodiment in FIG. 4, a projecting portion 36 may be formed not in a plate-like shape, but in a shape along a side surface of the xenon tube 2, for example. Even in this case, the projecting portion is able to make contact with a side surface of the xenon tube 2 (more specifically, in the side surface of the xenon tube 2, a side surface closer to the cathode-22 side than the anode-21-side end 23a of the sintered body 23 as the electron source), thereby making it possible to stably discharge the trigger voltage to the sintered body 23 from the projecting portion 36.

DESCRIPTION OF REFERENCE NUMERALS

1 . . . strobe device, 2 . . . xenon tube (tube), 3 . . . reflector, 21 . . . anode, 22 . . . cathode, 23 . . . sintered body (electron source), 23a . . . sintered-body anode-side end (anode-side end of electron source), 31 . . . front-surface opening portion, 32 . . . cathode-side side-surface opening portion (side-surface opening portion), 34 . . . bottom surface (surface having electric conductivity), 34a . . . bottom-surface cathode-side end (cathode-side end), 35 . . . projecting portion (projecting portion in strobe device of present embodiment), 36 . . . projecting portion (projecting portion in strobe device of another embodiment).

What is claimed is:

1. A strobe device comprising a tube having rare gas enclosed therein and having a light-transmitting property, and a reflector formed in a box shape into which the tube is housed, wherein:

the tube includes
an anode provided on one end of the tube,
a cathode provided on another end of the tube, the another end being provided opposite to the one end, and
an electron source having electric conductivity, placed at the another-end side inside the tube, electrically connected to the cathode, and supplying electrons for exciting the rare gas when a voltage is applied thereto;

the reflector has a surface at least partially having electric conductivity, has a front-surface opening portion provided on a front surface of the reflector and configured to be opened so that at least part of a side surface of the tube is exposed, and has a side-surface opening portion provided on a side surface of the reflector at the cathode side and configured to be opened so that the another end of the tube projects outwardly;

the reflector is configured such that the cathode-side end of the surface having electric conductivity is formed to be positioned closer to the anode side than the electron source; and the reflector includes an electrically-conductive projecting portion configured to project from the cathode-side end of the surface having electric conductivity so as to be closer to the cathode side than the anode-side end of the electron source.

2. The strobe device according to claim 1, wherein the projecting portion is formed integrally with the surface having electric conductivity.

\* \* \* \* \*